US007994756B2

(12) United States Patent
Rowland

(10) Patent No.: US 7,994,756 B2
(45) Date of Patent: Aug. 9, 2011

(54) POWER DISTRIBUTION CIRCUIT FOR USE IN A PORTABLE TELECOMMUNICATIONS DEVICE

(75) Inventor: Barry Rowland, Salo (FI)

(73) Assignee: Nokia Corporation, Espoo (FI)

( * ) Notice: Subject to any disclaimer, the term of this patent is extended or adjusted under 35 U.S.C. 154(b) by 645 days.

(21) Appl. No.: 11/747,684

(22) Filed: May 11, 2007

(65) Prior Publication Data

US 2008/0278221 A1 Nov. 13, 2008

(51) Int. Cl.

| | |
|---|---|
| ***H02J 7/04*** | (2006.01) |
| ***H02J 7/00*** | (2006.01) |
| ***H02J 7/16*** | (2006.01) |

(52) U.S. Cl. ......... 320/166; 320/167; 320/118; 320/137

(58) Field of Classification Search .................. 320/118, 320/137, 134, 116, 117, 166, 167

See application file for complete search history.

(56) References Cited

U.S. PATENT DOCUMENTS

| | | | | |
|---|---|---|---|---|
| 6,373,223 | B1 * | 4/2002 | Anzawa et al. | 320/118 |
| 7,477,040 | B2 * | 1/2009 | Bolz et al. | 320/118 |
| 2003/0169022 | A1 * | 9/2003 | Turner et al. | 320/166 |
| 2007/0279010 | A1 * | 12/2007 | Okamura et al. | 320/166 |
| 2008/0094042 | A1 * | 4/2008 | Ferrario | 323/234 |
| 2009/0273321 | A1 * | 11/2009 | Gotzenberger et al. | 320/166 |

* cited by examiner

*Primary Examiner* — Edward Tso
*Assistant Examiner* — Alexis Boateng
(74) *Attorney, Agent, or Firm* — AlbertDhand LLP

(57) ABSTRACT

A power distribution circuit for use in a personal telecommunications device comprises a switched mode power supply configured to convert an input voltage and current from an energy source into an output voltage and current, a plurality of series-connected charge storage components arranged to be charged by the output voltage and a charge balancing circuit configured to substantially equalise voltages across each of the charge storage components, wherein the charge balancing circuit comprises a charge pump.

18 Claims, 4 Drawing Sheets

$V_{max} = +5V$
1
2
3b
$V_{out}=+2.5V$
4
3a

POWER DISTRIBUTION CIRCUIT FOR USE IN A PORTABLE TELECOMMUNICATIONS DEVICE

FIELD OF THE INVENTION

The present invention relates generally to a power distribution system for distributing power from a power source in a portable telecommunications device.

BACKGROUND OF THE INVENTION

Portable telecommunications devices such as mobile telephones are incorporating an increasing number of functions and applications, such as MP3 players, WCDMA video calling, etc. which are leading to increased competition for the power resources provided by the battery. Many of the loads require large currents, with low voltage drops, for short periods.

Energy management in portable devices usually requires the use of various forms of voltage and current controllers, to stabilise, reduce or increase the voltage provided from the battery, or other energy source, or to control current delivered to a particular load. The voltage and current regulators may be any of, or a mix of, several types, including linear pass regulators, inductive boost, buck or buck/boost converters or capacitive boost, buck or buck/boost converters. These controlling elements have various operational characteristics that must be balanced against needs for efficiency, power delivery, ability and thermal considerations, as well as size and cost.

However, the battery itself, its protection circuitry, battery context and the power distribution circuitry all add resistance to the current path so that, in a typical, small portable device, safety concerns limit the amount of current that can be drawn from the battery to a maximum of approximately two to three amperes. Thus, simultaneous operation of loads which require higher peak power can become difficult, or impossible to manage within the constraints imposed on the battery by size, weight and cost.

Electro-chemical capacitors, often called "super-capacitors", provide a storage element for electrical energy with an energy density in between that of a battery and a capacitor, and are capable of delivering large currents with low equivalent series resistance (ESR). These super-capacitors can provide larger peak currents with lower voltage reduction than typical lithium-ion secondary cells. Super-capacitors may have a lower voltage rating than the output voltage desired in a system, and may be placed in a series configuration to provide a voltage at multiples of the voltage rating of an individual super-capacitor. Thus, super-capacitors can provide the peak current required, for relatively short periods, and can be charged from an energy source at the average current required by the loads connected to the super-capacitor.

Configurations using super-capacitors use a voltage boosting circuit element to provide a voltage increase to the super-capacitor, and a separate charge balancing circuit ensures the proper distribution of voltage across the capacitors over time. FIG. 1 shows an example of such a configuration. A boost converter 1 boosts a voltage from a battery 2. Two series-connected super-capacitors 3*a*, 3*b* are charged by the increased voltage, and power can be drawn from either super capacitor 3*a*, 3*b* to provide a high current for a short period to a load. A charge balancing circuit 4, in this case comprising a voltage divider and an opamp driver, balances the charge between the two super-capacitors 3*a*, 3*b*.

SUMMARY

The present invention provides a power distribution circuit for use in a portable telecommunications device comprising:

a switched mode power supply configured to convert an input voltage and current from an energy source into an output voltage and current;

a plurality of series-connected charge storage components arranged to be charged by the output voltage; and a charge balancing circuit comprising a charge pump configured to substantially equalize voltages across each of the charge storage components.

The invention also provides a method of distributing power in a portable telecommunications device comprising:

converting an input voltage and current from an energy source into an output voltage and current using a switched mode power supply;

charging a plurality of series-connected charge storage components by the output voltage;

substantially equalising voltages across each of the charge storage components, using a charge pump to redistribute charge between the charge storage components.

A charge pump is an electronic circuit that uses a combination of capacitors and switches to move charge among the capacitors to increase or decrease an input voltage, by connecting capacitors in various series and parallel configurations to achieve the desired result. Charge pump circuits are capable of high efficiencies, sometimes as high as 90-95%, yet they are relatively simple circuits. The simplest charge pump uses one charge transfer capacitor (known as the "flying capacitor") and an output capacitor to double or halve the input voltage. For instance, to double a voltage, the flying capacitor is first connected across an input or charging voltage and charged up. Then the capacitor is disconnected from the charging voltage and reconnected with its negative terminal connected to the original positive charging voltage. Because the flying capacitor retains the voltage across it (apart from small leakage losses) the positive terminal voltage is added to the original, doubling the voltage. The output voltage is pulsed and is typically smoothed by an output capacitor.

Preferably, the charge storage components are electrochemical capacitors. Preferably, the switched mode power supply is a buck converter or a buck/boost converter, wherein the output voltage is lower than the input voltage and the output current is higher than the input current.

Preferably, the output voltage charges a first one of the electrochemical capacitors, and the charge pump is arranged to transfer charge to the at least one remaining electrochemical capacitor. Thus, the charge pump takes charge from the lowest voltage capacitor and shifts the charge to a higher voltage capacitor and ensures that the voltage across each capacitor is very close to identical and thus provides integer multiplication of the voltage across the first capacitor, the integer being the number of series connected capacitors. Power for various loads in the system can be drawn from any one or from more than one of the capacitors, wherein the capacitor charge pump provides charge transfer maintaining the voltage across each capacitor substantially the same. The charge pump additionally transfers charge in the opposite direction onto the first capacitor if the voltage across any one of the capacitors is higher that of the first capacitor, for instance if current has been drawn from the first capacitor for a load. Also, if the energy source is a rechargeable battery, a voltage may be input via the charge pump acting as a voltage divider to charge the battery through a current and voltage converting circuit, such as a switching mode inductive buck, boost or buck-boost converter.

The present invention also provides a portable telecommunications device including a battery as an energy source and the power distribution circuit as disclosed above. Preferably, the battery is a rechargeable lithium ion battery.

BRIEF DESCRIPTION OF THE DRAWINGS

Embodiments of the present invention will now be described with reference to the accompanying drawings, in which.

DETAILED DESCRIPTION

Figure 2A:
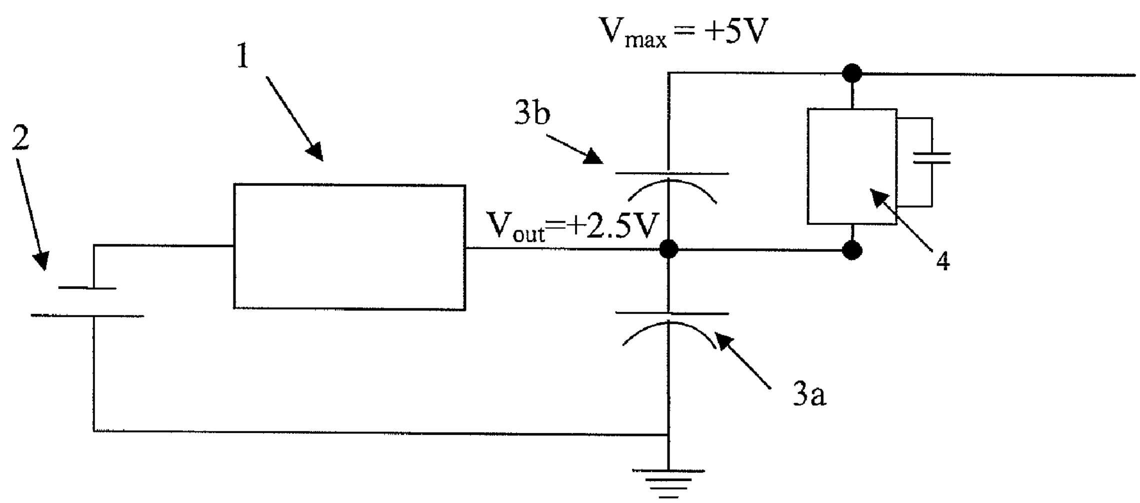
FIGS. 2A and 2B illustrates a power distribution circuit in accordance with a first embodiment of the present invention.
Figure 2B:
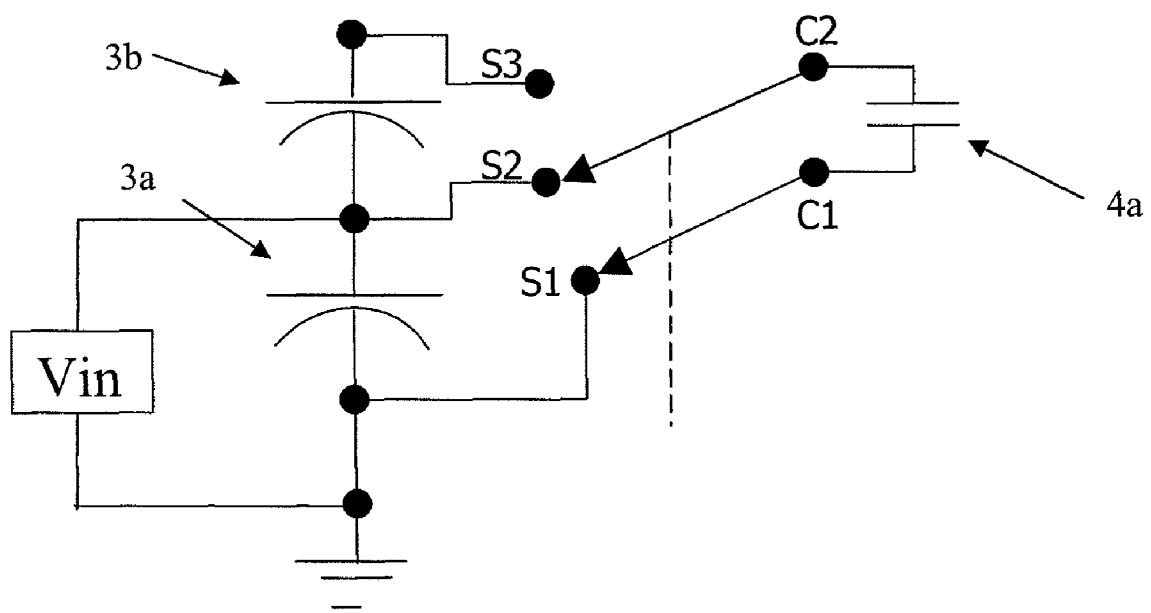

FIGS. 2A and 2B illustrate an embodiment of the invention using two charge storage components, which are electrochemical capacitors 3*a*, 3*b*, also known as “super capacitors”, connected in series. A switched mode power supply, in this case a buck or buck/boost converter 1 connected to the battery 2 operates to step down the voltage and provide an output voltage $V_{out}$ of 2.5 volts. Typical battery voltages may be 2.1+4.8V for a silicon anode Li battery, or 2.7+4.2V for current Li-ion cells. The buck converter 1 is arranged to provide an output voltage $V_{out}$ which is approximately half of the maximum desired output $V_{max}$ from the super-capacitor pair, in this case 5 volts.

The output voltage $V_{out}$ of the buck converter 1 is connected across the first super-capacitor 3*a* of the super-capacitor pair.

A charge pump voltage doubler 4 is connected across the second super-capacitor 3*b* and balances the voltage across the super-capacitors 3*a*, 3*b*, taking charge from the lowest voltage super-capacitor and shifting the charge to the higher voltage capacitor as loads draw current from the system. The charge pump 4 may also transfer charge to the first capacitor 3*a* from the second capacitor 3*b* if the first capacitor 3*a* has a lower voltage across it than on the second capacitor 3*b*.

FIG. 2B illustrates in more detail how the flying capacitor 4*a* of the charge pump 4 is switched in order to transfer charge between the first and second capacitors 3*a*, 3*b*. In FIG. 2B the battery 2 and buck converter 1 are omitted so that $V_{in}$ is the output voltage of the buck converter 1 of FIG. 2A.

Initially, the terminals C1 and C2 of the flying capacitor 4*a* are connected across the first capacitor 3*a*, to the ground terminal S1 and the mid-point terminal S2 respectively. The flying capacitor 4*a* is thus charged to $V_{in}$. The terminals C1 and C2 are then switched to be connected to terminals S2 and S3 respectively, so that charge on the flying capacitor 4*a* is transferred to the second capacitor 3*b*, and used to charge the second capacitor 3*b*, such that the voltage across the second capacitor is also $V_{in}$, making the total voltage across both capacitors 3*a*, 3*b* ie the voltage at terminal S3 equal to 2 $V_{in}$.

The charge pump 4 may contain controlling circuitry to allow its operation at different frequencies, depending on load and voltage, to reduce power consumption during times of low load operation. Further, the controlling circuitry may provide that the frequencies of operation may be selected during manufacture, or by programming in the application, either by hardware or software methods, such that they reduce interference effects at specific frequencies, dependent on the application environment.

The buck converter 1 may have functions allowing control of the maximum current input to the converter 1 or the maximum output current and may have a bypass mode, with current limiting, that allows operation when the input voltage falls to a point that the buck converter 1 can no longer provide the selected regulated output voltage.

It is also possible to use more than two series-connected super-capacitors. For instance, with three series-connected capacitors, the charge pump 4 can include further switching to move charge on one flying capacitor among the three series capacitors, or may include another flying capacitor that connects ultimately to the input capacitor and the third series capacitor.

Figure 3:
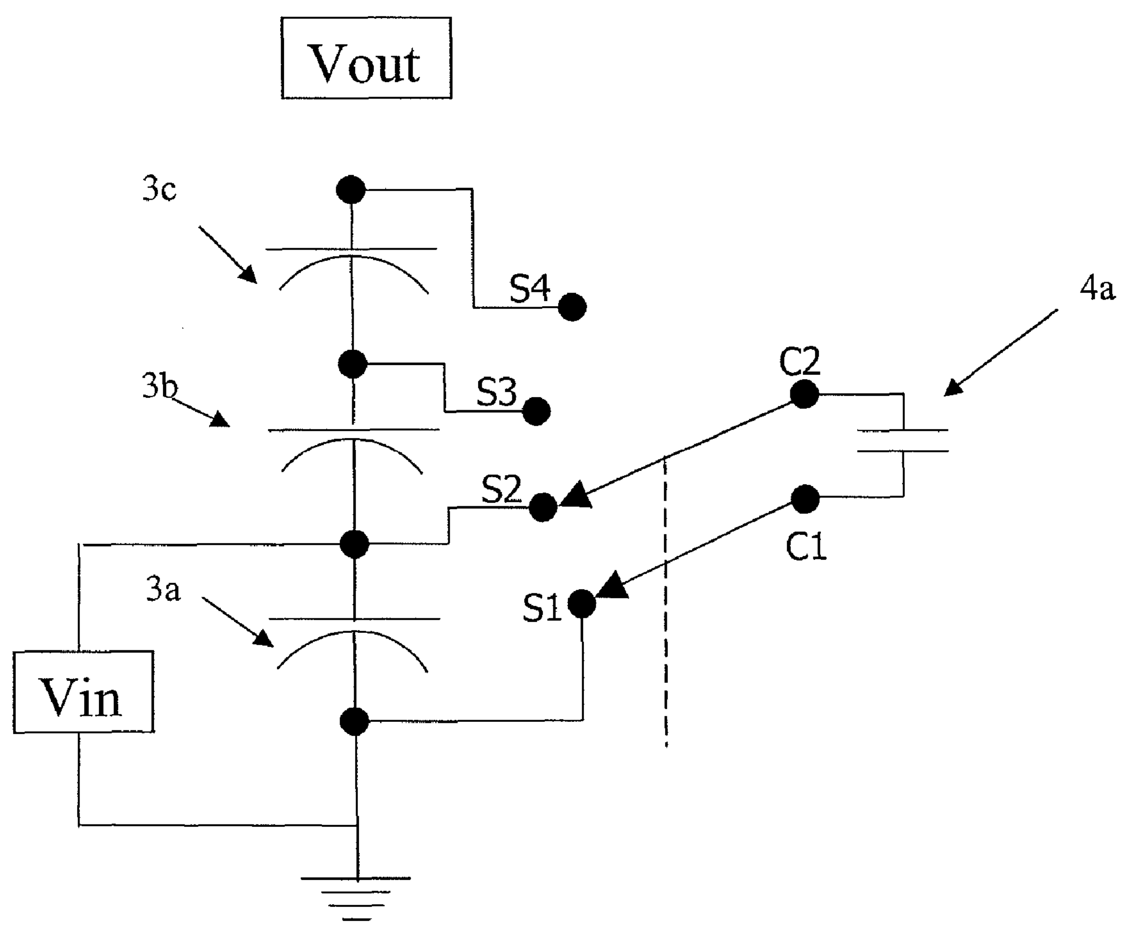
FIG. 3 illustrates a power distribution circuit in accordance with a second embodiment of the present invention.

FIG. 3 illustrates a second embodiment of the present invention, in which a flying capacitor 4*a* operates to move charge between three series connected electro-chemical capacitors 3*a*, 3*b*, 3*c*.

Initially, the terminals C1 and C2 of the flying capacitor 4*a* are connected across the first capacitor 3*a*, to the ground terminal S1 and the terminal S2 respectively. The flying capacitor 4*a* is thus charged to $V_{in}$. The terminals C1 and C2 are then switched to be connected to terminals S2 and S3 respectively, so that charge on the flying capacitor 4*a* is transferred to the second capacitor 3*b*, and used to charge the second capacitor 3*b*, such that the voltage across the second capacitor is also $V_{in}$, making the total voltage across both capacitors 3*a*, 3*b* ie the voltage at terminal S3 equal to 2 $V_{in}$. The flying capacitor terminals C1, C2 are then switched back to connect across the first capacitor terminals S1, S2 respectively to recharge the flying capacitor 4*a* from the input voltage $V_{in}$. The terminals C1, C2 of the flying capacitor 4*a* are then connected to terminals S3 and S4 respectively to transfer charge to the third capacitor 3*c*, thus resulting in a voltage of $V_{in}$ across the third capacitor 3*c*, and a voltage $V_{out}$ at terminal S4 of 3 $V_{in}$.

Alternatively, the flying capacitor 4*a* may be switched to transfer charge from the third capacitor 3*c* onto the second and/or first capacitors 3*a*, 3*b*. If current is drawn asymmetrically, additional switch phases may be included to guarantee the balance of charge between the three capacitors 3*a*, 3*b*, 3*c*.

Figure 1:
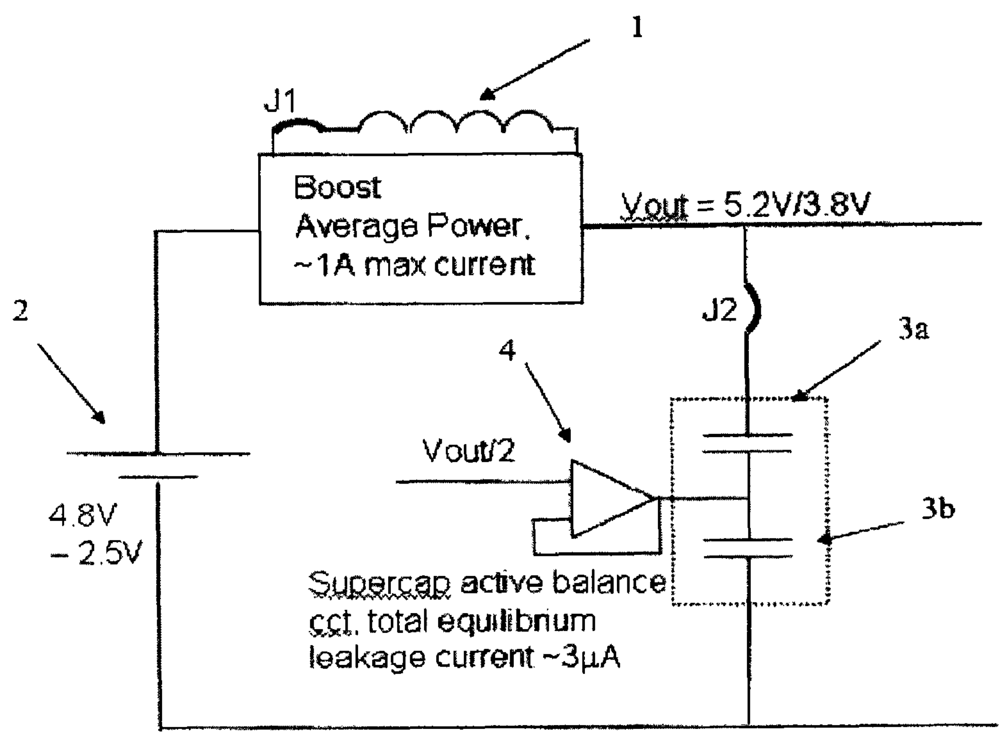
FIG. 1 shows a prior art power distribution circuit.

Prior art circuits using super-capacitors, such as that shown in FIG. 1 have used a boost converter, and some kind of active or passive circuit to balance the voltage between the capacitors. The boost converter is typically less efficient than a buck converter, and requires larger components, which get larger as the battery, or other energy source has a lower voltage. The buck converter and the capacitive charge pumps of the present invention operate with small, inexpensive components, with high efficiency in applications where the desired output voltage is the same as the ratio determined by the charge pump configuration.

The use of a buck converter and charge pump to control the current and voltage results in a combination that exhibits high overall efficiency and uses smaller components than other topologies. The charge pump provides inherent voltage balancing of the capacitor “stack”. The charge pump is advantageous in this integer ratio, operating at a high efficiency, usually greater than the 90%. The efficiency is dependent only on the switch transistor losses and the operating frequency, plus some minor losses from capacitor effective series resistance (ESR).

The charge pump allows energy stored in the upper capacitor to be moved to the lower capacitor, if required. This allows power to be drawn asymmetrically from the upper and lower voltages. Since the capacitor charge pump can transfer charge in either direction, it is also possible to input power to this circuit at the higher voltage and, in such operation, the charge pump can transfer power as needed to the lower voltage capacitor. Furthermore, in such a configuration, the converter that supplies power to the lower voltage capacitor from the energy source may be configured as a buck/boost converter allowing the battery to be charged, via the charge pump acting as a voltage divider, from the higher voltage input.

The circuit described above with respect to FIGS. 2A and 2B provides two voltages (2.5 volts and 5 volts) that may be supplied to other voltage and current controlling elements, allowing further optimisation of the power conversion implementation. The circuit of FIG. 3 can provide three voltages, at integer multiples of the input voltage $V_{in}$.

The present invention provides a circuit and method capable of powering high peak current loads with minimal impact on the battery, and to provide high overall power delivery efficiency to these high power loads. For example, to consider the case of the energy losses with a GSM pulsed load at 2A:

A typical portable device battery and power distribution system exhibits an impedance of approximately 300 mΩ, including battery internal impedance, contacts, protection circuits and PWB trace impedance. A super-capacitor typically has an internal impedance of approximately 50 mΩ.

Ignoring any conversion losses in a boost converter for the RF PA, or in the super-capacitor system, by using just battery voltage and fixed current for the comparison:

Battery System

Power loss=$I^2R$=2*2*0.3=1.2 W

At ⅛ duty cycle (normal for GSM call):

Power loss=1.2/8=0.15 W

Super Capacitor System

The power is averaged, so I=2 A*⅛=0.25 A

R=battery system impedance+super capacitor impedance=0.3+0.05=0.35Ω

Power loss=$(0.25)^2$*0.35=0.022 W in the battery distribution system

Plus losses in super capacitor charging=$(0.25)^2$*0.05=0.20 W@⅛ duty cycle=0.025 W

Total losses=0.047 W

Therefore, the losses in the super-capacitor system are approximately one third of the losses in the battery-based system.

The high voltage supplied by the circuit of the present invention enables the use of very efficient buck converters to power high current loads resulting in better battery life and reduced thermal loads. The high voltage provided may be used to power certain loads that require a higher voltage than supplied by the battery in a more efficient or low cost fashion, for example white or green LEDs may be powered through a simple resister and switch circuit, instead of am more complicated current source. RF power amplifiers may be also be powered effectively from the 5 volt supply. External power requirements such as USB OTG (USB On The Go) can also be powered effectively.

The real time clock (RTC) is normally provided with power from a small lithium cell to continue its operation for a short period while the battery is changed in the phone. The super-capacitor middle voltage, operating at approximately 2.5 volts, can eliminate the requirement for the small lithium cell and associated mounting considerations, reducing cost and volume. Loads powered from the mid-voltage point, with no load drawn from the higher voltage have, because of the charge pump's balancing mechanism, the total parallel capacity of the two series-connected storage elements available. It should be realised that the foregoing examples should not be construed as limiting. Other variations and modifications will be apparent to persons skilled in the art upon reading the present application. Such variations and modifications extend to features already known in the field, which are suitable for replacing the features described herein, and all functionally equivalent features thereof. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

The invention claimed is:

1. An apparatus comprising:

a switched mode power supply configured to convert an input voltage and current from an energy source into an output voltage that is lower than the input voltage and output current that is higher than the input current, the switched mode power supply comprising a buck converter;

a plurality of series-connected charge storage components arranged to be charged by the output voltage;

a charge balancing circuit comprising a charge pump configured to substantially equalise voltages across each of the charge storage components and flexibly supply power to a load, the charge pump first charging a lower voltage one of the charge storage components and subsequently charging a higher voltage one of the charge storage components.

2. An apparatus according to claim 1, wherein the charge storage components are electro-chemical capacitors.

3. An apparatus according to claim 2, wherein the output voltage charges a first one of the electro-chemical capacitors comprising the lower voltage one of the charge storage components, and the charge pump is arranged to transfer charge to the at least one remaining electro-chemical capacitor comprising the higher voltage one of the charge storage components.

4. A portable telecommunications device including a battery and a power distribution circuit comprising:

a switched mode power supply configured to convert an input voltage and current from the battery into an output voltage that is lower than the input voltage and output current that is higher than the input current, the switched mode power supply comprising a buck converter;

a plurality of series-connected charge storage components arranged to be charged by the output voltage;

a charge balancing circuit comprising a charge pump configured to substantially equalise voltages across each of the charge storage components and flexibly supply power to a load, the charge pump first charging a lower voltage one of the charge storage components and subsequently charging a higher voltage one of the charge storage components.

5. A portable telecommunications device according to claim 4, wherein the charge storage components are electro-chemical capacitors.

6. A portable telecommunications device according to claim 5, wherein the battery is a rechargeable lithium ion battery.

7. A portable telecommunications device according to claim 6, wherein the output voltage charges a first one of the electro-chemical capacitors comprising the lower voltage one of the charge storage components, and the charge pump is arranged to transfer charge to the at least one remaining electro-chemical capacitor comprising the higher voltage one of the charge storage components.

8. A method comprising:

converting an input voltage and current from an energy source into an output voltage that is lower than the input voltage and output current that is higher than the input current using a switched mode power supply comprising a buck converter;

charging a plurality of series-connected charge storage devices by the output voltage;

substantially equalising voltages across each of the charge storage devices, using a charge pump to redistribute charge between the charge storage devices and flexibly supplying power to a load, the charge pump first charging a lower voltage one of the charge storage components and subsequently charging a higher voltage one of the charge storage components.

9. The method of claim 8, wherein the charge storage devices are electro-chemical capacitors.

10. The method of claim 9, wherein the output voltage charges a first one of the electro-chemical capacitors comprising the lower voltage one of the charge storage component, and the charge pump is arranged to transfer charge to the at least one remaining electro-chemical capacitor comprising the higher voltage one of the charge storage components.

11. The method of claim 8, wherein the energy source is a battery.

12. The method of claim 11, wherein the energy source is a rechargeable lithium ion battery.

13. An apparatus according to claim 1, wherein a mid voltage point between at least two of the plurality of series-connected charge storage components supplies power to the load at a voltage equivalent to a total parallel capacity of the at least two of the plurality of series-connected charge storage components.

14. An apparatus according to claim 1, wherein the charge pump is further configured to operate at variable frequencies dependent upon at least the load.

15. A portable telecommunications device according to claim 4, wherein a mid voltage point between at least two of the plurality of series-connected charge storage components supplies power to the load at a voltage equivalent to a total parallel capacity of the at least two of the plurality of series-connected charge storage components.

16. A portable telecommunications device according to claim 4, wherein the charge pump is further configured to operate at variable frequencies dependent upon at least the load.

17. The method of claim 8 further comprising, supplying power to the load at a voltage equivalent to a total parallel capacity of the at least two of the plurality of series-connected charge storage components via a mid voltage point between the at least two of the plurality of series-connected charge storage components.

18. The method of claim 8 further comprising, operating the charge pump at variable frequencies dependent upon at least the load.

* * * * *